United States Patent
Hsieh et al.

(10) Patent No.: US 10,581,973 B2
(45) Date of Patent: Mar. 3, 2020

(54) COMPUTER SYSTEM AND BUS ARBITRATION METHOD

(71) Applicant: Wistron Corporation, New Taipei (TW)

(72) Inventors: Cheng-Kuang Hsieh, New Taipei (TW); Chung-Fu Huang, New Taipei (TW)

(73) Assignee: Wiwynn Corporation, New Taipei (TW)

( * ) Notice: Subject to any disclaimer, the term of this patent is extended or adjusted under 35 U.S.C. 154(b) by 282 days.

(21) Appl. No.: 15/343,217

(22) Filed: Nov. 4, 2016

(65) Prior Publication Data
US 2018/0041585 A1    Feb. 8, 2018

(30) Foreign Application Priority Data
Aug. 2, 2016 (TW) .............. 105124394 A

(51) Int. Cl.
*G06F 15/16* (2006.01)
*H04L 29/08* (2006.01)
*H04L 12/403* (2006.01)
*H04L 12/40* (2006.01)

(52) U.S. Cl.
CPC ............ *H04L 67/125* (2013.01); *H04L 12/40* (2013.01); *H04L 12/403* (2013.01); *H04L 67/1097* (2013.01)

(58) Field of Classification Search
CPC ...... H04L 12/40; H04L 12/403; H04L 67/125
See application file for complete search history.

(56) References Cited

U.S. PATENT DOCUMENTS

| | | | | |
|---|---|---|---|---|
| 5,915,102 A | * | 6/1999 | Chin ................. | G06F 13/364 710/113 |
| 6,807,593 B1 | * | 10/2004 | Moss ................. | G06F 13/36 710/110 |

(Continued)

FOREIGN PATENT DOCUMENTS

TW    201531864    8/2015

OTHER PUBLICATIONS

"Office Action of Taiwan Counterpart Application," dated Feb. 20, 2017,with English translation thereof,p. 1-p. 6, in which the listed references were cited.

*Primary Examiner* — Normin Abedin
(74) *Attorney, Agent, or Firm* — Winston Hsu

(57) ABSTRACT

A computer system and a bus arbitration method are provided. The computer system includes a bus, a plurality of master devices, and a slave device. The master devices and the slave device are coupled to the bus. Each of the master devices determines the number of the operating master devices through the bus. When a first master device intends to access the slave device, the first master device performs a bus arbitration on the slave device and attempts to access the slave device. If the slave device is accessed successfully, the first master device does not participate in N number of times of subsequent bus arbitrations. If the slave device is accessed unsuccessfully, the first master device determines whether the slave device is released. If the slave device is released, the first master device performs a next bus arbitration and attempts to access the slave device continuously.

9 Claims, 2 Drawing Sheets

(56) References Cited

U.S. PATENT DOCUMENTS

2013/0322461 A1* 12/2013 Poulsen .................... H04J 3/02
                                                  370/458
2014/0173162 A1*  6/2014 Danis ...................... G06F 13/32
                                                  710/310
2016/0350248 A1    12/2016 Dionisio et al.

* cited by examiner

COMPUTER SYSTEM AND BUS ARBITRATION METHOD

CROSS-REFERENCE TO RELATED APPLICATION

This application claims the priority benefit of Taiwan application serial no. 105124394, filed on Aug. 2, 2016. The entirety of the above-mentioned patent application is hereby incorporated by reference herein and made a part of this specification.

FIELD OF THE INVENTION

The invention relates to a control technology of a computer device; more particularly, the invention relates to a computer system and a bus arbitration method.

DESCRIPTION OF RELATED ART

Various devices in computer systems (e.g., servers/cloud storage devices) may be categorized into master devices and slave devices. If plural master devices need to access the same slave device through a bus, a bus arbitrator is often required, so as to determine how these master devices control the slave device in a certain order through applying a bus arbitration method and thus effectively make use of hardware resources. The bus arbitration method includes a fixed priority method, a round-robin method, a multi-level method, and so on.

However, said methods all require the operation of the bus arbitrator. In addition, if the number of the master devices/slave devices of the computer system is changed, time sequence, priority, and other parameters affecting the bus arbitration method should all be adjusted again. This leads to the lack of design flexibility and the extension of the development schedule of the computer system.

SUMMARY OF THE INVENTION

The invention is directed to a computer system and a bus arbitration method, whereby a bus arbitration mechanism between master devices may be applied to access a slave device in no need of placing any bus arbitrator. Moreover, each of the master devices is entitled to the equal right to access the slave device.

In an embodiment of the invention, a computer system includes a bus, a plurality of master devices, and a slave device. The master devices and the slave device are coupled to the bus. Each of the master devices determines the number of the operating master devices through the bus. When a first master device intends to access the slave device, the first master device performs a bus arbitration on the slave device and attempts to access the slave device. The first master device is one of the master devices. If the slave device is accessed successfully, the first master device does not participate in N number of times of subsequent bus arbitrations. Here, N is a difference obtained through subtracting the number of times for which the bus arbitration is participated by the first master device and performed on the slave device from the number of the master devices, and N is a non-negative integer. If the slave device is accessed unsuccessfully, the first master device determines whether the slave device is released. If the slave device is released, the first master device performs a next bus arbitration and attempts to access the slave device continuously.

In an embodiment of the invention, a bus arbitration method adapted to a first master device is provided. The first master device is in the computer system. The bus arbitration method includes following steps. The number of operating master devices is determined through a bus. When it is intended to access a slave device of the computer system, a bus arbitration is performed on the slave device to attempt to access the slave device. Here, the computer system includes a plurality of the master devices and the slave device, the first master device is one of the master devices, and the master devices and the slave device are coupled to each other through the bus. If the slave device is accessed successfully, N number of times of subsequent bus arbitrations are not participated in. Here, N is a difference obtained through subtracting the number of times for which the bus arbitration is participated by the first master device and performed on the slave device from the number of the master devices, and N is a non-negative integer. If the slave device is accessed unsuccessfully, whether the slave device is released is determined. If the slave device is released, a next bus arbitration is performed to attempt to access the slave device continuously.

In view of the above, in the computer system and through the bus arbitration method provided herein, each of the master devices may detect the existence of each other, so as to determine the possible number of times of performing the bus arbitration by itself and determine whether it may attempt to access the slave device through detecting the nature of the signal of the bus. If the master device accesses the slave device smoothly, the master device does not participate in the subsequent bus arbitrations, such that other master devices are offered the opportunity of accessing the slave device. If the master device accesses the slave device unsuccessfully, the master device continues to participate in the subsequent bus arbitrations. Thereby, the bus arbitration mechanism between the master devices may be applied to access the slave device in no need of placing any bus arbitrator, and each of the master devices is entitled to the equal right to access the slave device.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF EMBODIMENTS

Figure 1:
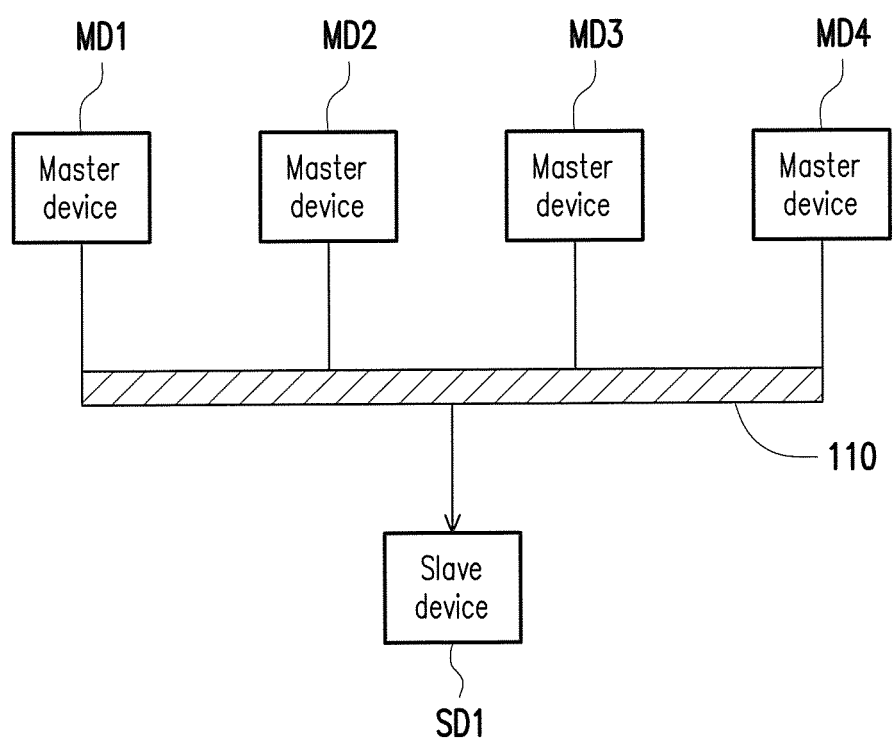
FIG. 1 is a schematic view illustrating a computer system 100 according to an embodiment of the invention.

FIG. 1 is a schematic view illustrating a computer system 100 according to an embodiment of the invention. As shown in FIG. 1, the computer system 100 includes a bus 110, a plurality of master devices MD1-MD4, and a slave device SD1. The master devices MD1-MD4 actively submit a request for accessing the slave device SD1. For instance, the master devices MD1-MD4 may be central processing units (CPU), digital signal processors (DSP), input/output interface controllers, and so forth. The slave device SD1 may be a sensor or a data storage device, e.g., a hard drive. The bus 110 may be an inter-integrated circuit (I2C) bus or a bus of any other type. The master devices MD1-MD4 and the slave device SD1 are coupled to the bus 110.

Figure 2:
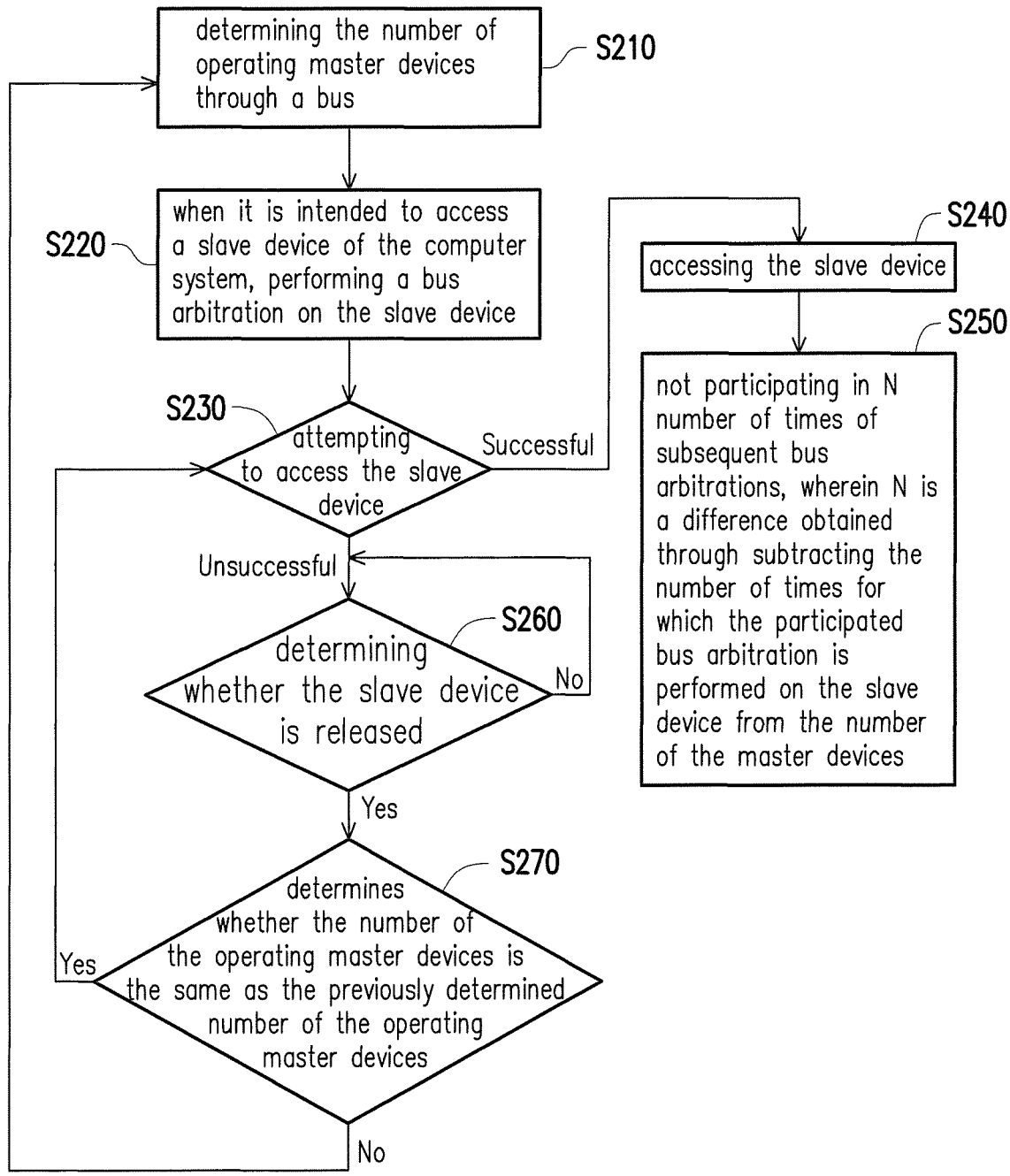
FIG. 2 is a flow chart of a bus arbitration method according to an embodiment of the invention.

FIG. 2 is a flow chart of a bus arbitration method according to an embodiment of the invention. The bus arbitration method is adapted to each of the master devices MD1-MD4 in the computer system 100 depicted in FIG. 1. That is, the bus arbitration method depicted in FIG. 2 is applied to each of the master devices MD1-MD4 according to the present embodiment, and therefore it is not required to arrange any bus arbitrator on the bus connecting to the master devices MD1-MD4.

Please refer to FIG. 1 and FIG. 2. The master device MD1 shown in FIG. 1 serves as an example to explain the present embodiment. In step S210, the master device MD1 determines the number of the operating master devices MD1-MD4 through the bus 110. Each of the master devices MD1-MD4 may communicate with other master devices MD1-MD4 based on heart beat signals of the operating master devices, so as to determine the number of the operating master devices MD1-MD4 through the bus 110. It is assumed that each of the master devices MD1-MD4 of the computer system 100 is in normal operation, and therefore the number of the operating master devices is 4. If, however, any of the master devices MD1-MD4 (e.g., the master device MD2) malfunctions or is shut down, the number of the operating master devices is adjusted to be 3. That is, the bus arbitration method provided in the present embodiment of the invention may be applied to instantly detect and adjust the number of the operating master devices. Accordingly, when the number of the master devices is adjusted, not other adjustment is required for the bus arbitration method provided in the present embodiment, and the bus arbitration method can still be applied immediately.

When the master device MD1 intends to access the slave device SD1, the master device MD1 performs a bus arbitration on the slave device SD1 (step S220) and attempts to access the slave device SD1 (step S230). If the slave device SD1 is accessed successfully, in step S240, the master device MD1 obtains the right to use the slave device SD1 and starts to access the slave device SD1. After the master device MD1 finishes accessing the slave device SD1, the master device MD1 sends an end signal through the bus 110, releases the slave device SD1, and allows other master devices MD2-MD4 to perform the next bus arbitration. In step S250, the master device MD1 does not participate in N number of times of subsequent bus arbitrations. Here, N is a difference obtained through subtracting the number of times for which the bus arbitration is participated by the master device MD1 and performed on the slave device SD1 from the number of the master devices MD1-MD4 (e.g., 4), and N is a non-negative integer. In the present embodiment, since the master device MD1 has participated in one "successful" bus arbitration, N is 3 obtained by subtracting 1 from 4. Hence, in order to allow other master devices MD2-MD4 to obtain the right to use the slave device SD1 through subsequent bus arbitrations, as provided herein, the master device MD3 does not participate in the three subsequent bus arbitrations.

The master device MD1 may learn the number of times of the bus arbitrations through the end signal sent by other master devices MD2-MD4 through the bus 110. The bus 110 provided in the present embodiment is an I2C bus with SCL and SDA pins; hence, the SCL of the end signal may be driven to logic "1", and the SDA of the end signal may be driven from logic "0" to logic "1" after a certain period of time.

Please return to step S230. If the master device MD1 does not successfully access the slave device SD1, it means that the master device MD1 does not obtain the right the access the slave device SD1. Hence, in step S260, the master device MD1 detects whether the bus 110 has the end signal, so as to determine whether the slave device SD1 is fully used and released.

If the slave device SDI. is released, in step S270, the master device MD1 again determines the number of the operating master devices MD1-MD4 to prevent the computer system 100 from malfunctioning. If the slave device is released, the first master device performs a next bus arbitration and attempts to access the slave device continuously. By contrast, if the number of the operating master devices is different from the previously determined number of the operating master devices, it indicates that the computer system 100 may malfunction, and thus the bus arbitration mechanism described herein should be reset.

Hence, please return from step S270 to step S210. The master device MD1 resets the number of the operating master devices MD1-MD4 and again performs bus arbitration on the slave device SD1. In the present embodiment, step 270 is a step of resetting the bus arbitration for preventing the computer system 100 from malfunctioning and may be deleted or may be performed in a different order according to actual needs.

According to the present embodiment, when the number of times of the participated bus arbitrations is equal to the number of the master devices, the master device MD1 directly accesses the slave device SD1 without performing any bus arbitration on the slave device SD1. For instance, if the number of the master devices is 4, the number of performing the bus arbitrations on the slave device SD1 by the master device MD1 is 3, and all three bus arbitrations fail, it is certain that the master device MD1 participating in the fourth bus arbitration is able to directly access the slave device SD1. This is because all the other master devices MD2-MD4 have accessed the slave device SD1 and thus cannot participate in the fourth bus arbitration.

To sum up, in the computer system and through the bus arbitration method provided herein, each of the master devices may detect the existence of each other, so as to determine the possible number of times of performing the bus arbitration by itself and determine whether it may attempt to access the slave device through detecting the nature of the signal of the bus. If the master device accesses the slave device smoothly, the master device does not participate in the subsequent bus arbitrations, such that other master devices are offered the opportunity of accessing the slave device. If the master device accesses the slave device unsuccessfully, the master device continues to participate in the subsequent bus arbitrations. Thereby, the bus arbitration mechanism between the master devices may be applied to access the slave device in no need of placing any bus arbitrator, and each of the master devices is entitled to the equal right to access the slave device.

It will be apparent to those skilled in the art that various modifications and variations can be made to the disclosed embodiments without departing from the scope or spirit of the invention. In view of the foregoing, it is intended that the invention covers modifications and variations of this disclosure provided that they fall within the scope of the following claims and their equivalents.

What is claimed is:

1. A computer system comprising:
a bus;
a plurality of master devices coupled to the bus; and a slave device coupled to the bus,
wherein each of the master devices determines the number of the operating master devices through the bus based on heart beat signals of the operating master devices,
when a first master device of the master devices device intends to access the slave device, the first master device performs a bus arbitration on the slave device and attempts to access the slave device,
if the slave device is accessed successfully, after the first master device finishes accessing the slave device, the first master device does not participate in subsequent N bus arbitrations, wherein N is a difference obtained by subtracting a number of times of bus arbitration participated by the first master device for accessing the slave device from the number of the operating master devices and is a non-negative integer,
if the slave device is accessed unsuccessfully, the first master device determines whether the slave device is released,
and if the slave device is released, the first master device performs a next bus arbitration and attempts to access the slave device continuously.

2. The computer system according to claim 1, wherein the bus is an inter-integrated circuit bus.

3. The computer system according to claim 1, wherein the slave device is a sensor or a data storage device.

4. The computer system according to claim 1, wherein when the number of times of the participated bus arbitrations is equal to the number of the master devices, the first master device directly accesses the slave device without performing any bus arbitration on the slave device.

5. The computer system according to claim 1, wherein after the first master device determines that the slave device is released, the first master device again determines the number of the operating master devices,
and if the number of the operating master devices is different from the previously determined number of the operating master devices, the first master device resets the number of the operating master devices and again performs a bus arbitration on the slave device.

6. A bus arbitration method adapted to a first master device in a computer system, wherein the computer system comprises a plurality of master devices, a slave device and a bus, the first master device is one of the master devices, and the master devices and the slave device are coupled to each other through the bus, the bus arbitration method comprising:
   determining the number of operating master devices through the bus based on heart beat signals of the operating master devices;
   when the first master is intended to access the slave device of the computer system, performing a bus arbitration on the slave device and attempting to access the slave device;
   if the slave device is accessed successfully, after the first master device finishes accessing the slave device, not participating in subsequent N bus arbitrations, wherein N is a difference obtained by subtracting a number of times of participated bus arbitration for accessing the slave device from the number of the operating master devices and is a non-negative integer;
   if the slave device is accessed unsuccessfully, determining whether the slave device is released; and
   if the slave device is released, performing a next bus arbitration and attempting to access the slave device continuously.

7. The bus arbitration method according to claim 6, wherein the bus is an inter-integrated circuit bus.

8. The bus arbitration method according to claim 6, further comprising:
   when the number of times of the participated bus arbitrations is equal to the number of the master devices, directly accessing the slave device without performing any bus arbitration on the slave device.

9. The bus arbitration method according to claim 6, further comprising:
   after the slave device is determined to be released, determining again the number of the operating master devices; and
   if the number of the operating master devices is different from the previously determined number of the operating master devices, resetting the number of the operating master devices and performing again a bus arbitration on the slave device.

* * * * *